US007672823B2

(12) United States Patent
Nikles et al.

(10) Patent No.: US 7,672,823 B2
(45) Date of Patent: Mar. 2, 2010

(54) COMPUTERIZED METHOD FOR ADHERENCE TO PHYSICAL RESTRICTION IN THE CONSTRUCTION OF AN ITE HEARING AID

(75) Inventors: Peter Nikles, Erlangen (DE); Erika Martinewski, Nürnberg (DE); Volker Gebhardt, Herzogenaurach (DE); Bassem Ismail, Erlangen (DE); Artem Boltyenkov, Erlangen (DE); Frank McBagonluri, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 848 days.

(21) Appl. No.: 11/516,222

(22) Filed: Sep. 5, 2006

(65) Prior Publication Data

US 2008/0126062 A1 May 29, 2008

(51) Int. Cl.

| | |
|---|---|
| ***G06F 17/50*** | (2006.01) |
| ***G06G 7/48*** | (2006.01) |
| ***H04R 25/00*** | (2006.01) |
| ***H04R 29/00*** | (2006.01) |

(52) U.S. Cl. .............................. 703/7; 703/1; 381/23.1; 381/60; 381/312

(58) Field of Classification Search ..................... 703/1, 703/7; 381/23.1, 60, 312
See application file for complete search history.

(56) References Cited

U.S. PATENT DOCUMENTS

| | | | | |
|---|---|---|---|---|
| 4,953,112 | A * | 8/1990 | Widin et al. | 703/6 |
| 6,920,414 | B2 * | 7/2005 | Tpholm | 703/1 |
| 7,050,876 | B1 | 5/2006 | Fu et al. | |
| 2004/0165740 | A1 | 8/2004 | Fang et al. | |

* cited by examiner

*Primary Examiner*—Paul L Rodriguez
*Assistant Examiner*—Nithya Janakiraman
(74) *Attorney, Agent, or Firm*—Schiff Hardin LLP

(57) ABSTRACT

In a computerized method for adherence to physical restrictions in the construction of an ITE hearing aid, each component to be placed in the shell of the hearing aid has a collision plot associated therewith. The collision plot is generated as a scatter plot by measurement and simulation, and represents the physical extent of the influence of a particular property of the component on other components. When virtual representations of the respective components are moved relative to another in the e-detailing software for determining the physical positions of the components in the ITE hearing aid, the collision plot for a given component is visually displayed, so that it can easily be seen when another component invades that collision plot, thereby representing an unacceptably close relative position of the two components.

8 Claims, 2 Drawing Sheets

COMPUTERIZED METHOD FOR ADHERENCE TO PHYSICAL RESTRICTION IN THE CONSTRUCTION OF AN ITE HEARING AID

BACKGROUND OF THE INVENTION

1. Field of the Invention

The present invention concerns a computerized method for use in the construction of an ITE (in the ear) hearing aid, and in particular to such a computerized method that causes the internal components within an ITE hearing aid to be positioned at appropriate locations.

2. Description of the Prior Art

An ITE hearing aid is a customized device that must conform to the individual anatomy of the hearing impaired person who will wear the ITE hearing aid. An ITE hearing aid generally is formed by a shell (also called an otoplastic) that is produced from a mold that has been made of the auditory canal of the person who will wear the ITE hearing aid. The interior of the shell is hollow, but has a shape that is dictated by the customized exterior shape of the shell. The shell generally tapers toward a narrow-most end, which will be fitted into the interior of the auditory canal, and at which the sound exit opening is located.

The opposite side of the shell, before insertion of the internal components, is open, and will face toward the exterior of the ear, when the ITE hearing aid is inserted into the auditory canal.

The electrical components of the ITE hearing aid are mounted on a face plate that closes the opening of the shell, with the components that are mounted on the face plate being enclosed within the interior of the shell.

Because the interior shape of the shell is not the same for each ITE hearing aid, in the conventional assembly of such an ITE hearing aid, considerable craftsmanship is necessary on the part of the person who assembles the hearing aid, in order to mount the components on the face plate so that they will not only mechanically fit into the particularly shaped interior of the shell, but also so that unwanted electrical, electromagnetic, and acoustical interactions among the components will be avoided or minimized. A significant part of appropriately mounting (adapting) the alignment of the earpiece in the shell is to achieve an appropriate alignment such that no feedback is perceptible. For this purpose, a procedure tales place generally by trial-and-error until the structure-born sound coupled from the earpiece via the shell to the microphone causes no feedback whistling. Other hearing device components are integrated on the faceplate and thus are already physically (mechanically) adapted.

All physical restrictions, such as eddy current losses of the battery and of the hybrid circuit, disruptive radiation by conductors, and the like must be taken into consideration in the fixed positioning on the faceplate. Moreover, in the Acuris hearing aid that is commercially available from Siemens AG, an antenna is provided and the interaction of that antenna with other components of the hearing aid must also be taken into account.

As the desire for more components in modern hearing aid increases, the space requirement on the face plate also increases, as well as the minimum necessary area for the faceplate itself.

Moreover, depending on the individual anatomy of the auditory canal, the available space in the auditory canal often is not optimally utilized.

A computer-assisted e-detailing (electronic detailing) process for assembling an ITE hearing aid is known from PCT Application WO 02/071794. In this known procedure, the detailed design of the hearing device ensues virtually in a computer-assisted e-detailing process after an electronic scanning of the auditory canal. The shell then can be constructed using an SLA machine. Space can be gained by virtue of the components being individually placed in this procedure.

SUMMARY OF THE INVENTION

An object of the present invention is to provide a computerized method that improves the ability to position components in an ITE hearing aid, with adherence to physical restrictions.

The above object is achieved in accordance with the present invention by a computerized method wherein, for each component, a collision plot is generated that is a scatter plot determined by measurements, simulations, etc., and brought into a suitable file format, such as STL. In conventional e-detailing software, this collision plot is logically linked to the virtual component. In the execution of the computerized method according to the invention, in order to ensure acceptable operation of the ITE hearing aid, the collision plot of one virtual component cannot enter into the collision plot of another virtual component. Since there may be a number of different factors having different physical influences on components that are close to each other, each component may have a number of collision plots linked thereto, such as a magnetic collision plot, an electrical collision plot, an acoustic collision plot, etc.

As the virtual components are manipulated so that a relative angle, for example, changes between the virtual components, the influences and thus also the size and the shape of the respective collision plots can change. Therefore, in addition to different collision plots for different physical influences, different collision plots can exist dependent on physical effect, influenced components and relative angles.

Moreover, for physical influences that superimpose, additional collision plots can be used that represent an enlargement of the existing, individual collision plots. The collision plots could also be calculated in real-time when suitable measurement arrangement or simulation arrangements permit this. The calculation of the collision plots can be embodied in the e-detailing software itself.

DESCRIPTION OF THE PREFERRED EMBODIMENTS

Figure 1A:
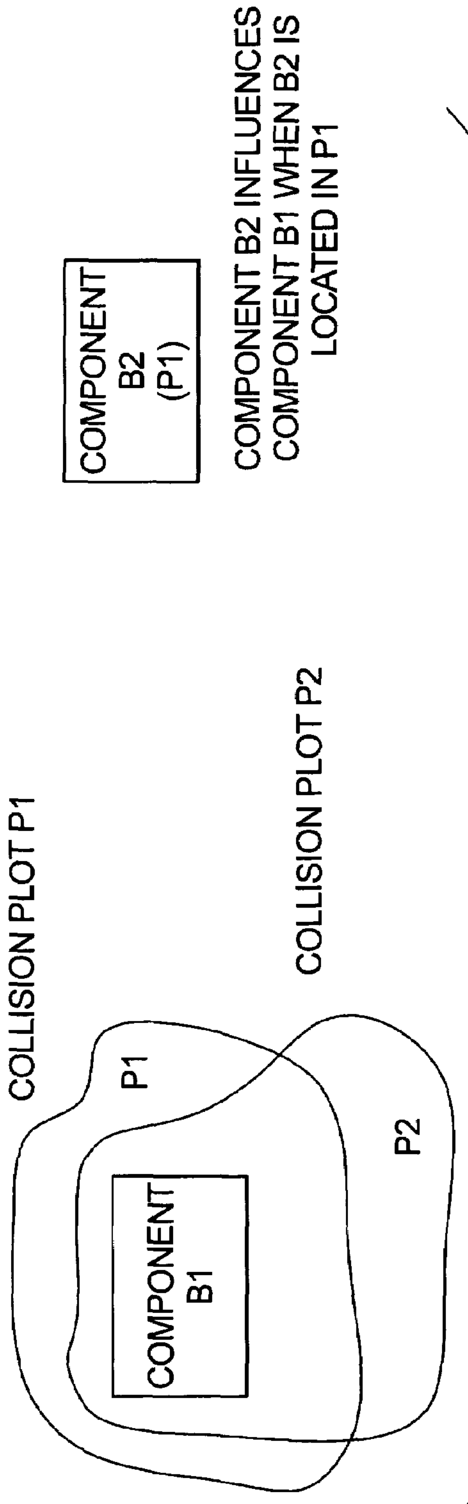
FIGS. 1A, 1B and 1C schematically illustrate the use of collision plots to adhere to physical restrictions in the construction of an ITE hearing aid, in accordance with the present invention.

FIG. 1A schematically illustrates the concept of the use of collision plots in the e-detailing software for constructing an ITE hearing aid. Component B1 has a collision plot P1 logically linked thereto, and component B2 has a collision plot P2 logically linked thereto. The respective collision plots are scatter plots that are determined by suitable measurements, simulations, etc., and are represented in a suitable file format, such as STL. In the e-detailing software, the collision plots are respectively linked to the components associated therewith, so that as the virtual representations of the components are moved or adjusted in the e-detailing software, the collision plot that is logically linked thereto moves correspondingly. As indicated in FIG. 1A, component B2 influences component B1 when B2 is located in collision plot P1.

Figure 1B:
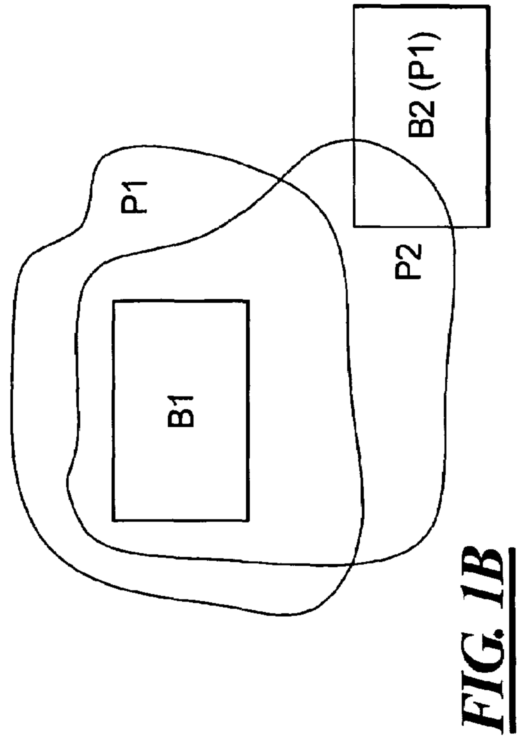

FIG. 1B illustrates an acceptable situation for the component B2 with respect to the collision plot P1 of the component B1, because the virtual representation of the component B2 is outside of the collision plot P1.

Figure 1C:
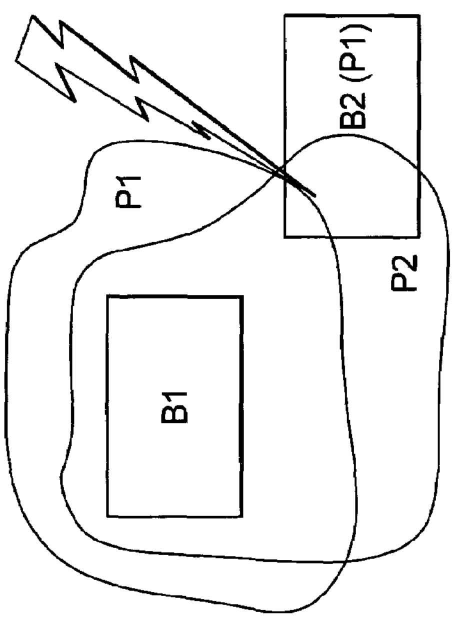

FIG. 1C illustrates an unacceptable situation, because the virtual representation of the component B2 has entered into the collision plot P1 of the component B1.

Depending on the nature of the collision plot P1, this may represent an unacceptable degree of magnetic coupling, an unacceptable degree of electrical coupling, an unacceptable degree of acoustic coupling, etc.

FIGS. 2A through 2D illustrate how the shape of the collision plot can change dependent on different factors, such as the angle $\alpha$ that the component B2 makes in the plane of the drawing with respect to a predetermined axis, and the rotational angle $\beta$ that the component B2 makes with respect to a predetermined rotational axis.

Figure 2A:
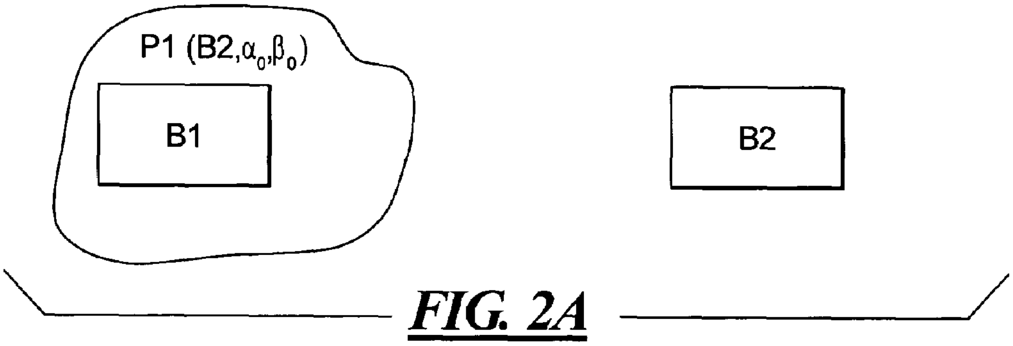
FIGS. 2A, 2B, 2C and 2D illustrate the influence of angle positions of components on the collision plots in accordance with the present method.

FIG. 2A shows the collision plot P1 for the component B1, determined for the component B2 at a nominal orientation angle $\alpha_0$ and a nominal rotational angle $\beta_0$. In the example shown in FIG. 2A, these nominal angle positions are 0°.

Figure 2B:
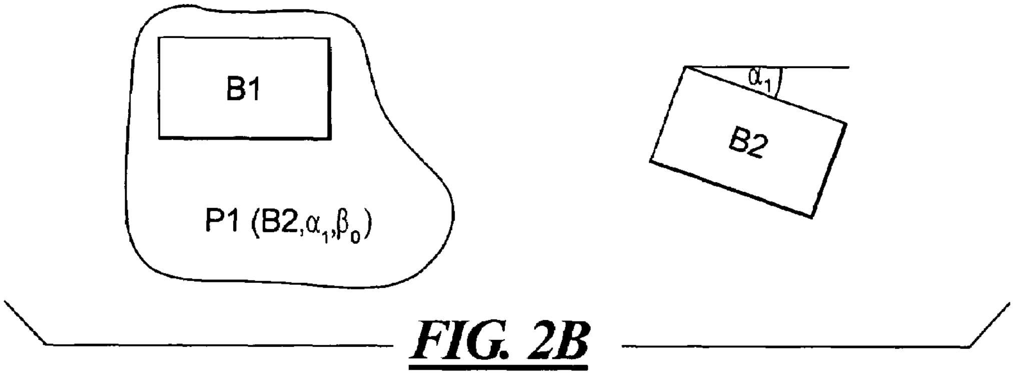
Figure 2C:
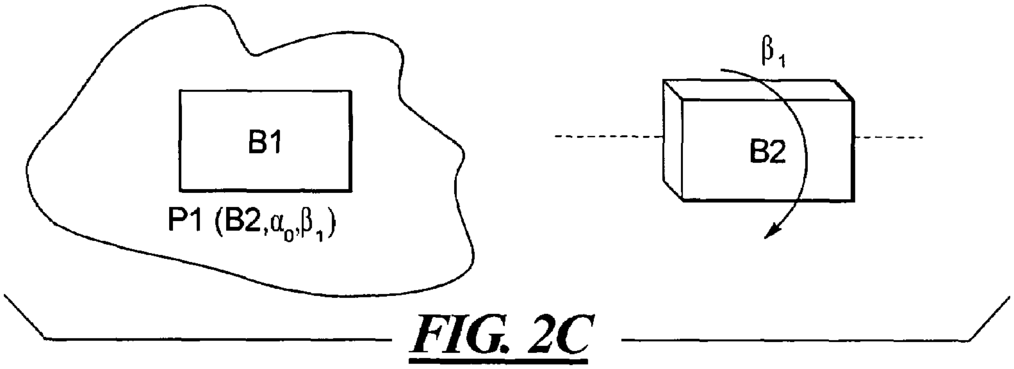

FIG. 2B shows how the collision plot P1 changes if the component B2 changes in position to an angle $\alpha_1$, but is not rotated. FIG. 2C shows how the shape of the collision plot P1 changes if the component B2 retains the nominal orientation angle $\alpha_0$, but is rotated by a rotational angle $\beta_1$.

Figure 2D:
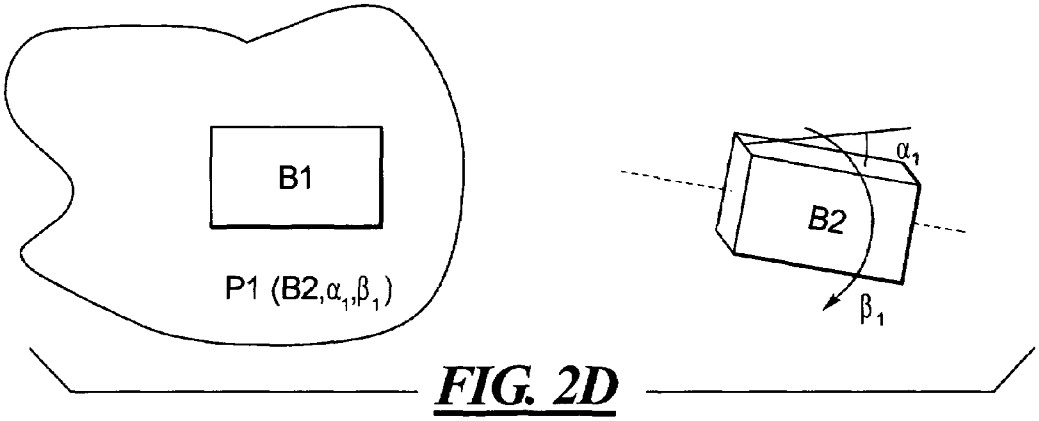

FIG. 2D shows how the shape of the collision plot P1 changes if the component B2 is positioned both at an orientation angle $\alpha_1$ and at a rotational angle $\beta_1$.

The method can be implemented by a computer-readable medium, encoded with program code for generating and using the aforementioned collision plots, that is loaded into a computer in which a conventional e-detailing software program is executed. The method can be embodied in a similar manner in the e-detailing software itself. The collision plots can be pre-calculated, or can be calculated in real-time if appropriate analytical algorithms are provided. The e-detailing software itself can be provided with simulation software that directly calculates the collision plots within the context of the e-detailing software program.

The inventive method allows an easy visual representation of problems that must be avoided in the positioning of components in the construction of an ITE hearing aid. The collision plots can use the same routines for collision determination as already-existing mechanical collision determinations. Complex interrelationships can be determined in advance for respective components, by measurements and simulations, and thus are available immediately during assembly. The plots represent an easily understandable visual representation of all physical restrictions, and the technician who assembles the hearing aid does not have to understand the details of the various physical interrelationships, but need only comprehend the need to avoid a situation as shown in FIG. 1C in order to construct the ITE hearing aid. Complex procedural assembly instructions thus are not necessary.

In the specific example of assembling a hearing aid that has an antenna, it has been necessary for the technician to engage in a relatively long training period in order to learn how to place the antenna relative to the earpiece so that the disruptive influence of the earpiece is reduced, while still ensuring a radio connection to another hearing aid device for binaural feed. Using the collision plots in accordance with the invention, the assembly can be calculated with temporal precision, because no tests and no repeated opening and sealing of the hearing device (rework) is necessary. The product quality therefore is known, and can even be increased. The collision plots allow all of the components to be individually placed. Depending on the geometry of the auditory canal for a particular ITE hearing aid, the specific existing space therein can be utilized more efficiently, which can result in a smaller and more cosmetically acceptable ITE hearing aid.

Conventionally, certain types of more complex ITE hearing aids could not be assembled by mass production in a satisfactory manner. The inventive method allows even such complex ITE designs to be constructed quickly and efficiently, thereby making even these complex ITE technologies suitable for mass production.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a method for constructing an ITE hearing aid using an e-detailing program in which each component of the ITE hearing aid has a visually displayable virtual representation representing a physical size of that component, the improvement comprising the steps of:

for each of said components, electronically determining a collision plot that is larger than the virtual representation of that component and that represents a region within which that component exerts a non-mechanical influence on other components;

electronically logically linking the collision plot for a component to the virtual representation of that component;

at a display, visually displaying the collision plot for a first of said components together with the visual representation for the first of said components;

at said display, moving the visual representation of a second of said components with respect to the visual representation of the first of said components to identify an acceptable position of said second of said components relative to said first of said components in the ITE hearing aid; and providing a visual indication at said display of an unacceptable relative position if said virtual representation of said second of said components invades said collision plot of said first of said components.

2. A method as claimed in claim 1 comprising generating said collision plots as scatter plots by measurement and simulation.

3. A method as claimed in claim 1 comprising, for each of said components, generating a plurality of collision plots respectively for different non-mechanical physical characteristics.

4. A method as claimed in claim 1 comprising generating said collision plot to represent a magnetic influence exerted by the component to which the collision plot is logically linked.

5. A method as claimed in claim 1 comprising generating said collision plot to represent an electrical influence exerted by the component to which the collision plot is logically linked.

6. A method as claimed in claim 1 comprising generating said collision plot to represent an acoustic influence exerted by the component to which the collision plot is logically linked.

7. A method as claimed in claim 1 comprising changing a size and shape of said collision plot of said first of said components dependent on an angle of the virtual representation of said second of said components.

8. A computer-readable medium encoded with program code for use in a computer with a computerized e-detailing program in which each component of the ITE hearing aid has a visually displayable virtual representation representing a physical size of that component, causing said computer to:

for each of said components, electronically determine a collision plot that is larger than the virtual representation of that component and that represents a region within which that component exerts a non-mechanical influence on other components;

electronically logically link the collision plot for a component to the virtual representation of that component;

at a display, visually display the collision plot for a first of said components together with the visual representation for the first of said components;

at said display, allow manual movement at the visual representation of a second of said components with respect to the visual representation of the first of said components to identify an acceptable position of said second of said components relative to said first of said components in the ITE hearing aid; and provide a visual indication at said display of an unacceptable relative position if said virtual representation of said second of said components invades said collision plot of said first of said components.

* * * * *

UNITED STATES PATENT AND TRADEMARK OFFICE

CERTIFICATE OF CORRECTION

PATENT NO. : 7,672,823 B2
APPLICATION NO. : 11/516222
DATED : March 2, 2010
INVENTOR(S) : Peter Nikles et al.

It is certified that error appears in the above-identified patent and that said Letters Patent is hereby corrected as shown below:

On the Title Page, Item (75), Applicant name incorrectly spelled for Fred McBagonluri. Name reads as Frank McBagonluri. Name should read Fred McBagonluri Signed and Sealed this Twenty-seventh Day of April, 2010

David J. Kappos

*Director of the United States Patent and Trademark Office*